United States Patent
Trantham

(10) Patent No.: US 7,857,233 B2
(45) Date of Patent: Dec. 28, 2010

(54) ELECTRONICALLY BASED CONTROL VALVE WITH FEEDBACK TO A BUILDING MANAGEMENT SYSTEM (BMS)

(75) Inventor: John M. Trantham, Hurst, TX (US)

(73) Assignee: Flow Design, Inc., Dallas, TX (US)

( * ) Notice: Subject to any disclaimer, the term of this patent is extended or adjusted under 35 U.S.C. 154(b) by 472 days.

(21) Appl. No.: 11/847,718

(22) Filed: Aug. 30, 2007

(65) Prior Publication Data

US 2008/0053115 A1 Mar. 6, 2008

Related U.S. Application Data

(60) Provisional application No. 60/824,400, filed on Sep. 1, 2006.

(51) Int. Cl.
F24F 11/053 (2006.01)

(52) U.S. Cl. .................. 236/1 C; 62/185; 165/209; 700/282

(58) Field of Classification Search .................. 236/1 C; 62/185, 201; 165/209; 700/282, 277
See application file for complete search history.

(56) References Cited

U.S. PATENT DOCUMENTS

| | | | |
|---|---|---|---|
| 3,384,155 A | | 5/1968 | Newton |
| 3,693,704 A | | 9/1972 | Newton |
| 4,150,788 A | * | 4/1979 | Matsumoto et al. ......... 237/8 R |
| 4,173,124 A | * | 11/1979 | Fujii et al. ..................... 60/667 |
| 4,459,818 A | | 7/1984 | Kaya et al. |
| 4,559,788 A | | 12/1985 | McFarlan |
| 4,850,201 A | | 7/1989 | Oswalt et al. |

(Continued)

FOREIGN PATENT DOCUMENTS

EP 0 795 724 3/1997

(Continued)

OTHER PUBLICATIONS

PCT Notification of Transmittal of the International Search Report and The Written Opinion of the International Searching Authority, or the Declaration, PCT/US2007/077353, dated Apr. 27, 2009, 13 pages.

*Primary Examiner*—George Nguyen
(74) *Attorney, Agent, or Firm*—Baker Botts L.L.P.

(57) ABSTRACT

According to one embodiment of the invention, a method for regulating temperature in a system comprises receiving, at a building management system, information concerning a degree of opening of a plurality of control valves. Each of the plurality of control valves is associated with at least one terminal that is in communication with a supply header line of a system, and is operable to open or close according to its own logic based on the demand of the associated terminal or terminals. A determination is made, based on the degree of opening of the plurality of control valves, as to whether changes need to be made to the operating parameters of production equipment of the system. The changes to the production equipment operation of the system are operable to change at least one parameter of a fluid being supplied to the supply header line of the system. An initiation of changes is made if it is determined that the change needs to be made. The changes in the production equipment yield a difference in the at least one parameter of the fluid.

22 Claims, 3 Drawing Sheets

U.S. PATENT DOCUMENTS

| | | | |
|---|---|---|---|
| 5,209,401 A * | 5/1993 | Fiedrich | 237/8 C |
| 5,284,204 A | 2/1994 | Morgan | |
| 5,340,460 A * | 8/1994 | Kobayashi et al. | 204/298.09 |
| 5,347,825 A * | 9/1994 | Krist | 62/179 |
| 5,556,027 A * | 9/1996 | Fiedrich | 237/8 C |
| 5,813,061 A * | 9/1998 | Tornqist | 4/431 |
| 5,907,956 A | 6/1999 | Arima et al. | |
| 6,050,098 A | 4/2000 | Meyer et al. | |
| 6,349,552 B2 | 2/2002 | Shimoda et al. | |
| 6,352,106 B1 * | 3/2002 | Hartman | 165/293 |
| 6,449,969 B1 | 9/2002 | Fujimoto et al. | |
| 6,467,537 B1 * | 10/2002 | Bujak, Jr. | 165/209 |
| 6,658,870 B1 | 12/2003 | Jenkins | |
| 6,701,726 B1 | 3/2004 | Kolk et al. | |
| 6,732,540 B2 | 5/2004 | Sugihara et al. | |
| 6,792,766 B2 * | 9/2004 | Osborne et al. | 62/159 |
| 6,845,627 B1 | 1/2005 | Buck | |
| 6,854,285 B2 | 2/2005 | Jessen | |
| 7,028,768 B2 | 4/2006 | Aler et al. | |
| 2001/0003347 A1 | 6/2001 | Shimoda et al. | |
| 2003/0014161 A1 * | 1/2003 | Orthlieb et al. | 700/277 |
| 2004/0011066 A1 | 1/2004 | Sugihara et al. | |
| 2004/0068999 A1 | 4/2004 | Jessen | |
| 2004/0237554 A1 | 12/2004 | Stark et al. | |
| 2005/0039904 A1 | 2/2005 | Aler et al. | |
| 2005/0127314 A1 | 6/2005 | Piehl et al. | |

FOREIGN PATENT DOCUMENTS

| | | |
|---|---|---|
| EP | 1 156 285 | 4/2001 |
| GB | 2 245 967 | 6/1991 |

* cited by examiner

US 7,857,233 B2

ELECTRONICALLY BASED CONTROL VALVE WITH FEEDBACK TO A BUILDING MANAGEMENT SYSTEM (BMS)

CROSS-REFERENCE TO RELATED APPLICATIONS

Pursuant to 35 U.S.C. §119 (e), this application claims priority from U.S. Provisional Patent Application Ser. No. 60/824,400, entitled ELECTRONICALLY BASED CONTROL VALVE WITH FEEDBACK TO A BUILDING MANAGEMENT SYSTEM (BMS), filed Sep. 1, 2006.

TECHNICAL FIELD OF THE INVENTION

This invention relates generally to the field of heat transfer and, more particularly, to an electronically based control valve with feedback to a building management system (BMS).

BACKGROUND OF THE INVENTION

A variety of different heat transfer systems use water or other fluids to transfer heat or thermal energy between one or more production units and one or more loads. Such systems are often referred to as hydronic systems.

Many such systems employ variable pumping in which the speed of the pumps or number of active pumps is varied to maintain a constant pressure cross some terminal, sometimes referred to as the "index circuit." The logic of choosing this circuit is to provide sufficient pressure to all circuits by providing enough pressure to the circuit with the most demanding needs. The disadvantage to this approach is that the circuit with the greatest need does not remain constant. Some circuits might need more pressure than others, but initially have enough pressure as a result of their location within the network. As the total flow in the distribution system decreases and the pressure difference between the risers in various locations equalizes, such circuits would become the most demanding.

SUMMARY OF THE INVENTION

According to one embodiment of the invention, a method for regulating temperature in a system comprises receiving, at a building management system, information concerning a degree of opening of a plurality of control valves. Each of the plurality of control valves is associated with at least one terminal that is in communication with a supply header line of a system, is operable to open or close based on the demand at the associated terminal, and contains a means for sensing its own degree of opening and communicating this to some type of building or energy management system. A determination is made, based on the degree of opening of the plurality of control valves, as to whether changes need to be made to production equipment operating parameters of the system The changes to the production parameters of the system are operable to change at least one parameter of a fluid being supplied to the supply header line of the system. An initiation of changes is made if it is determined that the change needs to be made. The changes in the production equipment yield a difference in the at least one parameter of the fluid.

Certain embodiments of the invention may provide numerous technical advantages. For example, certain embodiments may allow the individual terminal to still regulate its return water temperature even if communication to the building management system failed. Additionally, certain embodiments may allow the building production equipment to be operated in an efficient manner without undue cost or complication. Still further, certain embodiments may allow a system to be more robust since the failure of communication with a single valve would only occasionally degrade the efficiency of the system; the remaining valves would typically provide enough information. Yet another advantage of certain embodiments may be the ability to use low cost self-acting valves while still giving the central building management system all the information and control needed for efficient system operation. A further advantage of certain embodiments might be the ability to remotely detect a malfunction of one of the valves.

Although specific advantages have been enumerated above, various embodiments may include all, some, or none of the enumerated advantages. Additionally, other technical advantages may become readily apparent to one of ordinary skill in the art after review of the following figures and description.

BRIEF DESCRIPTION OF THE DRAWINGS

For a more complete understanding of example embodiments of the present invention and its advantages, reference is now made to the following description, taken in conjunction with the accompanying drawings, in which.

DETAILED DESCRIPTION OF THE INVENTION

It should be understood at the outset that although example embodiments of the present invention are illustrated below, the present invention may be implemented using any number of techniques, whether currently known or in existence. The present invention should in no way be limited to the example embodiments, drawings, and techniques illustrated below, including the embodiments and implementation illustrated and described herein. Additionally, the drawings are not necessarily drawn to scale.

Figure 1:
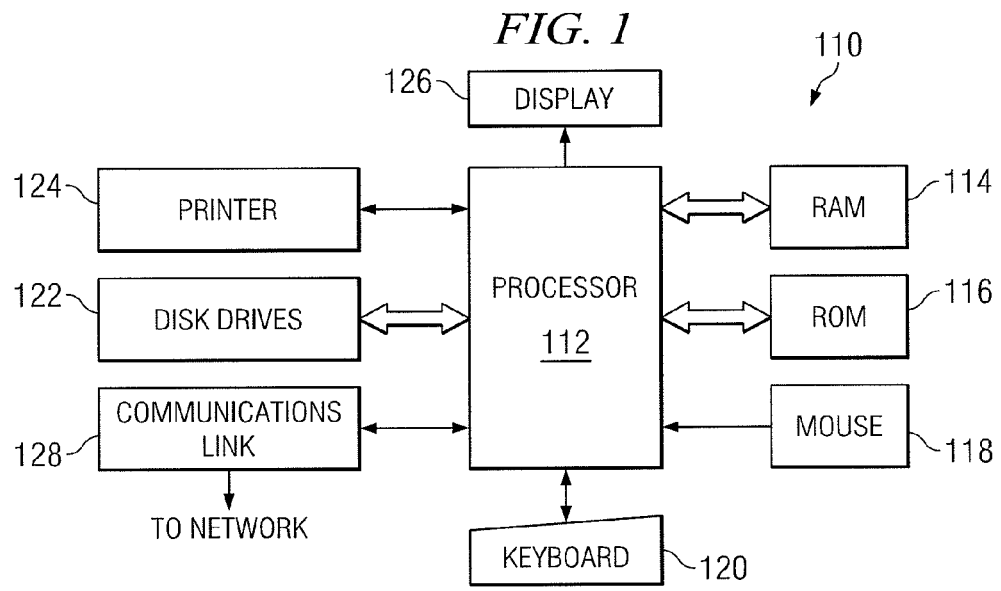
FIG. 1 shows an embodiment of a general purpose computer that may be used in connection with one or more pieces of software and/or hardware employed by other embodiments of the invention.

FIG. 1 shows an embodiment of a general purpose computer 110 that may be used in connection with one or more pieces of software and/or hardware employed by other embodiments of the invention. General purpose computer 110 may be adapted to execute any of the well-known OS2, UNIX, Mac-OS, Linux, and Windows Operating Systems or other operating systems. The general purpose computer 110 in the embodiment of FIG. 1 comprises a processor 112, a random access memory (RAM) 114, a read only memory (ROM) 16, a mouse 118, a keyboard 20 and input/output devices such as a printer 124, disk drives 122, a display 126 and a communications link 128. In other embodiments, the general purpose computer 110 may include more, fewer, or other component parts.

Embodiments of the present invention may include programs that may be stored in the RAM 114, the ROM 116, disk drives 122, or other suitable memory and may be executed by the processor 112. The communications link 128 may be connected to a computer network or a variety of other communicative platforms including, but not limited to, a public or private data network; a local area network (LAN); a metropolitan area network (MAN); a wide area network (WAN); a wireline or wireless network; a local, regional, or global communication network; an optical network; radio communications; a satellite network; an enterprise intranet; other suitable communication links; or any combination of the preceding. Disk drives 122 may include a variety of types of storage media such as, for example, floppy disk drives, hard disk drives, CD ROM drives, DVD ROM drives, magnetic tape drives or other suitable storage media. Although this embodiment employs a plurality of disk drives 122, a single disk drive 22 may be used without departing from the scope of the invention.

Although FIG. 1 provides one embodiment of a computer that may be used with other embodiments of the invention, other embodiments of a computer may additionally utilize computers other than general purpose computers as well as general purpose computers without conventional operating systems. Additionally, embodiments of the invention may also employ multiple general purpose computers 110 or other computers networked together in a computer network. Most commonly, multiple general purpose computers 110 or other computers may be networked through the Internet and/or in a client/server network. Embodiments of the invention may also be used with a combination of separate computer networks each linked together by a private or a public network.

Several embodiments of the invention may include logic contained within a computer-readable medium. In the embodiment of FIG. 1, the logic comprises computer software executable on the general purpose computer 110. The medium may include the RAM 114, the ROM 116 or the disk drives 122. In other embodiments, the logic may be contained within hardware configuration or a combination of software and hardware configurations. The logic may also be embedded within any other suitable medium without departing from the scope of the invention.

Figure 2:
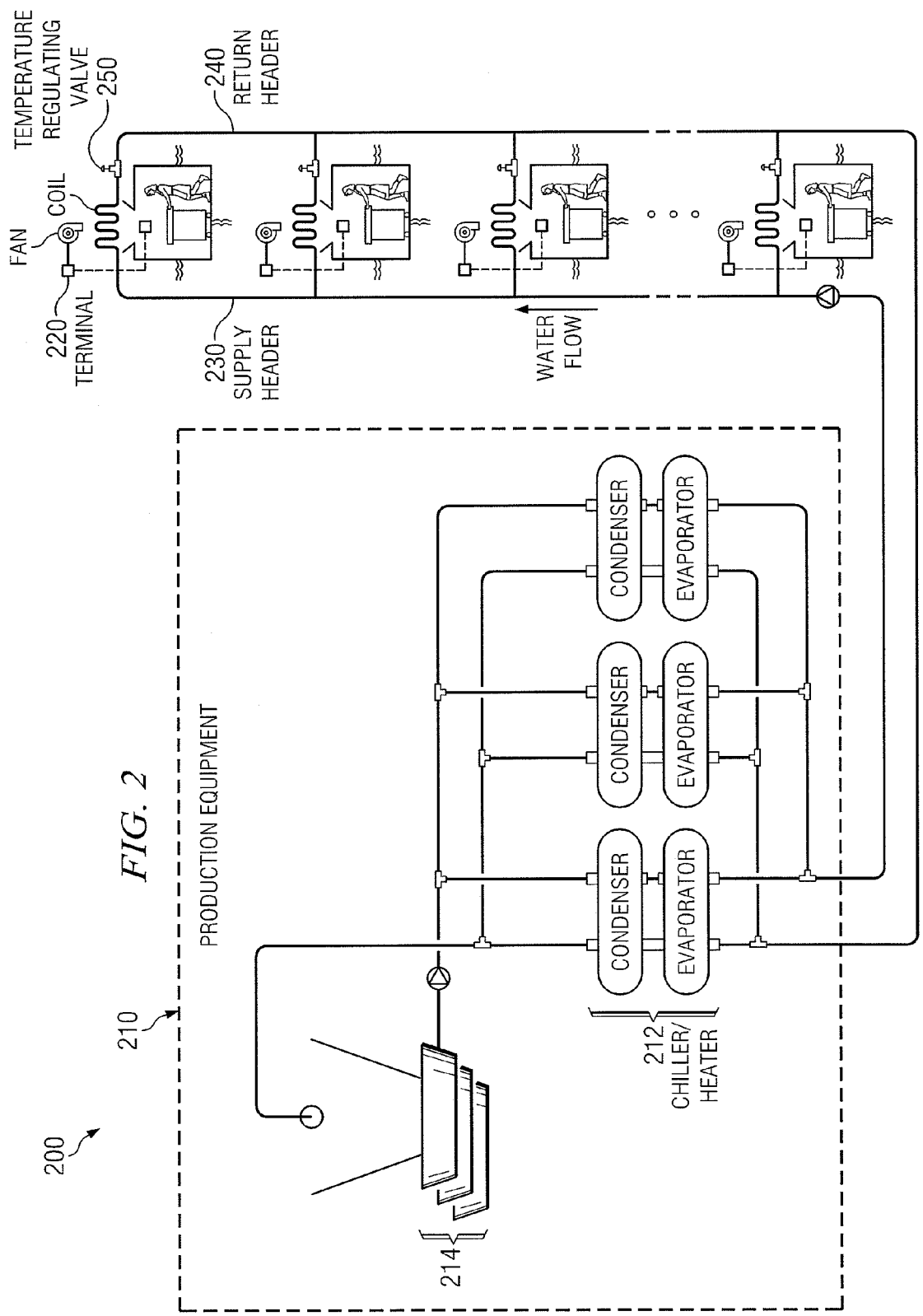
FIG. 2 is an example system in which embodiments of the invention may be utilized.

FIG. 2 is an example system 200 in which embodiments of the invention may be utilized. For purposes of illustration, the system 200 will be described as a hydronic cooling system, sometimes known as a "chilled water" system. While this specific system will be described, it should be understood that embodiments of the invention may be used in conjunction with other systems, including, but not limited to, hot fluid systems. Additionally, although specific components will be described with reference to this system, it should be understood that other embodiments may be utilized in systems with more, fewer, or different components parts.

The system 200 of FIG. 2 includes production equipment 210, which supplies cold fluid (e.g., including, but not limited to, water) to one or more terminal units 220 using a network of piping, shown in FIG. 2 as the supply header line 220. Among other items, the production equipment 210 may include chillers 212 and pumps 214. In particular embodiments, the chillers 212 may comprise condensers and evaporators.

Each terminal unit 220 may include component items such as, but not limited to fans and coils. The cold fluid supplied by the supply header line 230 rises in temperature as the cold fluid passes through the terminal units 220 due to the heat or thermal energy being removed from various "loads." That is, the thermal energy is transferred to the fluid. These loads can include, but are not limited to, air in rooms of buildings or various industrial processes. In particular embodiments, the fans associated with terminals may either change in speed or turn on and off in response, for example, to the temperature of a particular room in a building.

After passing through the terminal unit 220, the fluid (now including the transferred thermal energy) returns to the network of piping (shown in FIG. 2 as the return header line 240), which returns the fluid back to the production equipment 210.

Control valves may be associated with terminal units 220. In general, such control valves open and close as a result of loads presented at each respective terminal. In the system 200 of FIG. 2, a temperature regulating valve 250 is used to maintain a constant temperature of fluid returning from the terminal units 220 to the return header line 240. An example of such a valve is described in U.S. patent Ser. No. 11/465,650, which is assigned to the same assignee of the current application. The entirety of U.S. patent Ser. No. 11/465,650 is hereby incorporated by reference.

As alluded to above, although the system 200 of FIG. 2 is generally shown as a chilled water system, it should be understood that embodiments of the invention may be used in conjunction with other systems, including, but not limited to, hot fluid systems. In hot fluid systems, hot fluid is supplied to terminals and the thermal energy in the hot fluid is transferred to the terminals resulting in a reduction in the temperature of the hot fluid. In such systems, heaters may used in lieu of chillers. Heat can also be provided to the system by heat pumps or other devices.

The result of an operation of the system 200 in particular embodiments may be an extremely low flow of fluid when there is no load on the terminal (such as when the fan speed was slow or the fan was off) and an increased flow of fluid with an increased load.

The valves of in particular embodiment may be operable to maintain a constant return water temperature, However, it should be understood that other factors such as an external control signal or the temperature of air near the terminal could be used in deciding the degree of opening of the valve. Each valve may be supplied with a means of detecting its degree of opening and transmitting this information to a building or energy management system. As these valves change position, they not only change the flow rate to their individual circuit, but they cumulatively change the pressure distribution in the system for a building. The speed of the pump that circulates cooling fluid may be controlled to maintain a constant pressure drop across some circuit in the network.

As indicated in the Background, system designers may seek the circuit which has the least excess pressure available at design conditions, called the "index circuit", and maintain a constant pressure drop across that circuit. The drawback to this is that as the overall circulation in the building reduces, the pressure across the circuits becomes more nearly equal. The result can be that with constant pressure drop across the index circuit, some of the "more favored" circuits actually have too little pressure during off-peak conditions. Some system designers may seek to maintain a constant pressure change across the pump. This can result in the index circuit having excessive pressure as the flow rate in the overall network decreases. This approach also leaves the pressure at a higher value than needed on all circuits, thereby using more than the theoretical minimum pump energy. A common compromise is to locate a pressure transmitter in the "middle" of the building. However, this results in a reduced version of the problems from each of the other approaches.

The traditional approach of sensing the pressure difference between the supply and return headers is further complicated when the system has many branches. In such a case the designer would at least be forced to locate a pressure sensor on each branch. Additionally, it is known in the industry that for management of fan power in the air side of the system, building management systems (BMS) may "poll" various air handlers to determine their demand. The fan speed is then set so that the most demanding air handler has enough pressure. This results in a fan speed which is at the lowest level which can meet the demand.

With reference to the system 200 of FIG. 2, if a temperature regulating valve 250 is 100% open, the system 200 may not be supplying appropriate cold fluid parameters (either temperature-wise, volume-wise, or both) for an appropriate heat (or thermal energy) transfer. Accordingly, the operating parameters of the production equipment 210 may need to be changed, for example, by increasing pump speed or decreasing fluid temperature. Contrariwise, if the most open temperature regulating valve 250 in the system 200 is 70% open, the system 200 may be able to cut back on certain operating parameters of the production equipment 210, for example, by decreasing pump speed or increasing temperature. When the pump speed decreases, the system 200 may decrease the pressure difference between the supply and return headers, resulting in a greater degree of opening at each valve in order to achieve the same flow rate. This may have many benefits in particular embodiments as will be explained further below. Accordingly, teachings of certain embodiments of the invention recognize a system and method of obtaining system requirements and adjusting the system on an "as needed" basis. Teaching of certain embodiments also recognize the use of a valve that can maintain a constant return fluid temperature, and can send the position of its stem, in a range from 0 to 100%, back to the building management system. Further details of particular embodiments are provided below.

Figure 3A:
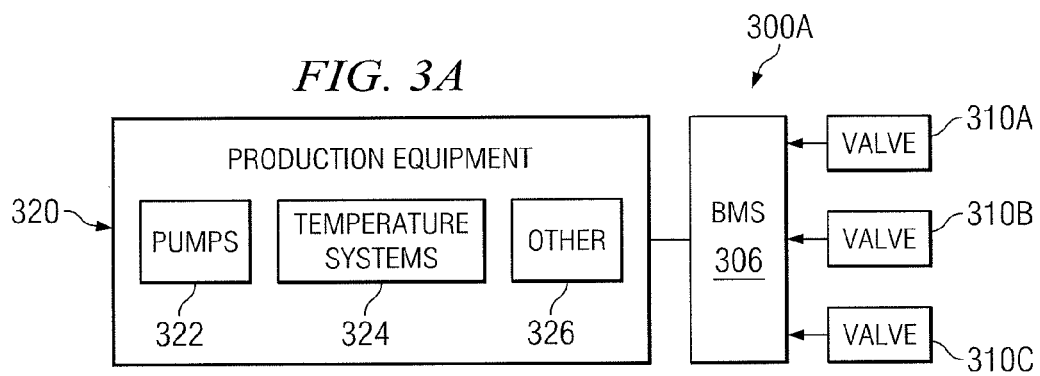
FIGS. 3A and 3B graphically depict an operation of systems, according to embodiments of the invention.
Figure 3B:
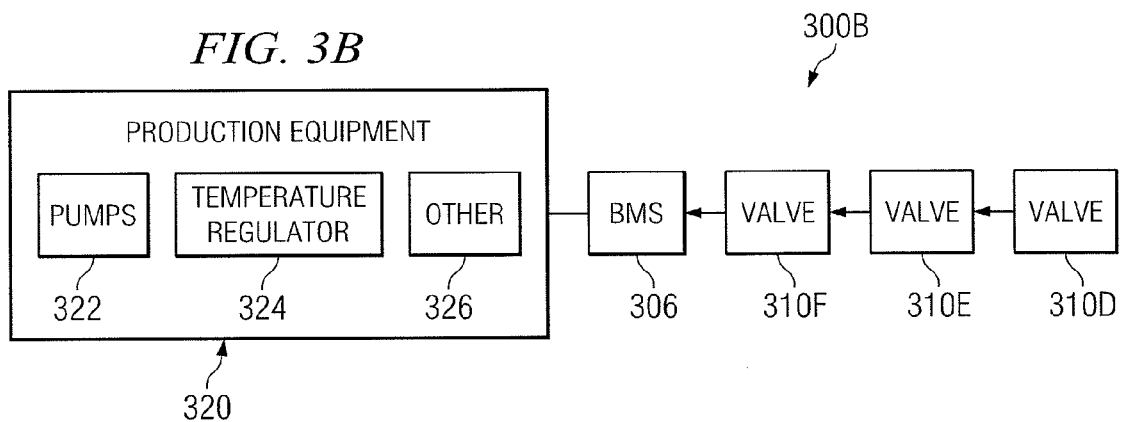

FIGS. 3A and 3B graphically depict an operation of systems, according to embodiments of the invention. FIGS. 3A and 3B show system which help meet the needs of components (e.g., terminals) of the system on an "as needed" basis. That is, for example, a particular temperature of supply fluid and/or a particular volume of supply fluid may be supplied to the system over time on an as needed basis. In particular embodiments, this as-needed supply of system parameters for the fluid may increase the overall efficiency of the system.

In FIG. 3A, in a system 300A, a building management system (BMS) 300 is shown as receiving information from a plurality of valves 310A, 310B, and 310C. The information communicated by the valves 310A, 310B, and 310C may include a variety of information, including, but not limited to, a valve identifier, a valve-stem position, the degree the valve is opened, a size of the valve, and a temperature of a fluid at the valve. In particular embodiments, some of the communicated information may inform the BMS 306 what is happening at a particular terminal. As an illustrative example, the load on a particular terminal may have recently drastically increased, causing the degree to which the valve at the terminal is opened. Such information may be communicated to the BMS 306 to allow the BMS 306 to make appropriate changes.

Based on the information received from the plurality of valves 310A, 310B, and 310C, the BMS 306 may determine whether or not changes need to be made to production equipment 300 to change parameters of fluid supplied to a supply header line. In particular embodiments, the BMS 306 may modify pumps 322 to change a flow rate of the fluid being supplied to a supply header line. In other embodiments, the BMS 306 may modify temperature systems 324 to change a temperature of fluid being supplied to a supply header line. In other embodiments, the BMS 306 may modify other systems 326 to change other parameters of the fluid. In yet other embodiments, the BMS 306 may modify any combination of the three preceding items (pumps 322, temperature systems 324, or other systems 326) to modify parameters of the fluid supplied to supply header line. Additionally, in particular embodiments, certain valves may be associated with certain subsystems. In such embodiments, the BMS 306 may only change production equipment associated with such subsystems.

To facilitate this determination as to what modification, if any, is necessary, the BMS 306 in particular embodiments may include a variety of logic encoded in media and components that are similar or different than the components of the general purpose computer 110 of FIG. 1. The determination logic may consider a variety of items, including, but not limited items which effect an overall efficiency of the system, loads throughout the system, the distances of certain loads from the production equipment, sizing and number of valves associated with a particular load, the number and capacity of pumps, the capacity of chillers (for cooling systems) and/or heaters (for heating systems). Other example efficiency considerations for an embodiment of a cooling system, may include, but are not necessarily limited to items discussed above and the following:

1. Chillers operate best if they have a comparatively high temperature change, often known as "delta T";
2. In order to achieve a good delta T, over-circulation in the hydronic system must be prevented;
3. As the flow rate is reduced, the pressure across various circuits increases. This can cause difficulty for control valve accuracy since a high pressure causes the valve to operate in a nearly closed position. In such a condition, small changes to the stem position cause large changes to the flow rate. This can result in unstable control;
4. Excess pressure causes noise;
5. Excess pressure wastes power;
6. The extra power used to pump at an excessive pressure becomes heat in the hydronic system. In the case of a cooling system, this means that the extra heat must be removed by the chillers;
7. Excess pressure causes increased wear on components throughout the system through erosion and fatigue;
8. Pressure sensors with the reliability to provide the correct values for a long period of time are too expensive to place on every circuit; and
9. Excess fluid circulation has little effect on the air temperature either in the room or in the duct, and is therefore often not detected.

For heating systems, similar or different efficiency considerations may be undertaken. Further details of logic that may be utilized, according to particular embodiments, are discussed below.

The information communicated from the valves to the BMS 306 may use any communication medium, including, but not limited to, all or a portion of a public switched telephone network (PSTN); a public or private data network; a local area network (LAN); a metropolitan area network (MAN); a wide area network (WAN); a global computer network such as the Internet; a wireline or wireless network; a local, regional, or global communication network; a satellite network; an enterprise intranet; other suitable communication links; or any combination of the preceding.

FIG. 3A shows each valve 310A, 310B, and 310C communicating information directly (via wirelines or wireless) to the BMS 306 while FIG. 3B shows a relayed communication. That is, in FIG. 3B, valve 310D communicates information to valve 310E. Then, valve 310E communicates information for both valve 310E and valve 310D to valve 310F. Then, valve 310F communicates information for valve 310D, 310E, and 310F to the BMS 306. In particular embodiments, the valves may communicate using a combination of these techniques. Further, in particular embodiments, the communication of information to the BMS 306 may avail from a building infrastructure, including use of phone lines, power lines, ethernet lines, and even the piping itself (signals being modulated down the piping network).

The below discussion references several example operations, according to particular embodiments. In certain embodiments (e.g., chilled water systems), the BMS 306 may find the valve with the most open position, and reduce the pump speed until that position was nearly fully open. In such embodiments, a threshold value may be chosen below 100% open, so that the valve may still have the ability to increase the flow rate in response to demand. This may become necessary in certain embodiments because without this consideration, the pump could go to an excessively low speed. The chosen position for the most open valve might be, as an example, 90%. If the most open valve were at 95%, the pump would speed up slightly. Similar technique may also be used for hot fluid systems.

In other embodiments, a supply temperature of a fluid may be modified as a result of the positions of the stems. For example, with reference to a chilled fluid system, as the demand decreased, the chilled fluid temperature could be changed, for example, from 42 to 45 degrees. This would result in a higher flow demand in all circuits, creating a more open condition for the valves. By increasing the supply temperature of the chilled fluid, the efficiency of the chillers may also be increased. The chilled fluid supply temperature may be controlled in a similar fashion to that described for the pump speed above, so that the most open valve was about 90% open (or another suitable value). Similar technique may also be used for hot fluid systems.

In yet other embodiments, the building management system may choose to modify both the pump speed and the fluid supply temperature based on the valve openings. For instance, with reference again to chilled fluid systems, the pump speed could be reduced until it reached 50%, and then the chilled fluid supply temperature could be reset as the demand continued to decrease.

In particular embodiments, the fluid supply temperature would not be allowed to change beyond that required for humidity control. In these embodiments, since the return temperature is being maintained at something close to the desired dew-point temperature, the supply temperature would need to remain below that temperature by an amount sufficient to account for all inaccuracies in measurement and control.

In particular embodiments, the system may also account for changes in the location of the most demanding circuit which can arise from a variety of factors. For example, a unit in the system may have a pressure drop across the circuit higher than that for the index circuit. If such a circuit were located nearer to the pump, it might have easily enough pressure at the design condition. However, as the demand lowered and the pressure across the various circuits decreased, such a circuit would naturally get less than the designed flow rate.

As another example, in particular embodiments, a circuit may be very heavily loaded while the rest of the system is not. In such a circumstance, it might be desirable to allow that circuit to flow more than its normal design value, as long as the fluid is being effectively used to improve occupant comfort. Since the return fluid temperature is being used to control the position of the valve, it may only demand flow which will increase the heat transfer. A combined heat transfer and flow analysis shows that maintaining the same return fluid temperature at various loads may result in about the same percent of the theoretical maximum heat transfer.

The following is a discussion on theoretical maximum heat transfer, which may be utilized by some embodiments. If the fluid flowing inside the coil were to move infinitely fast, the inside surface of the tube would be at the supply fluid temperature. The heat transfer between the fluid and the air passing over the outside of the heat exchanger would then be at its highest possible value. This is a theoretical condition, since any heat transferred into the fluid from the surrounding air will raise the temperature of the fluid. So, this condition can only be approached as the fluid flow rate approaches infinity. At more realistic velocities it might, for example, it may be possible to achieve 90% of this theoretical maximum heat transfer while having a temperature rise of the fluid of, for example, 10° F. For a different air velocity, the flow rate to achieve 90% of theoretical heat transfer would be different, but the temperature rise in the fluid associated with that new fluid flow would again be about 10° F. The only effect the fluid flow has on the heat transfer is to set the temperature at the inside of the tube.

The following are two illustrative set-ups that may be utilized in particular embodiments: (1) a thermally actuated valve with a sensor for the stem position, and (2) a small electronic package with a temperature sensor, communications ability, and the ability to control an actuator on a common ATC.

In the first illustrative embodiment, a thermally actuated valve is equipped with a sensor to detect the position of a valve stem. Since this position is not being used to control the fluid flow rate, the demand for accuracy might be only about 1% or so. A device may also be used to send the signal from the system back to the BMS. The device may use a variety of signals sent on wired or wireless communication mediums.

Particular embodiments may detect a position of a stem using frequency based detection. In such an embodiment, a small coil of wire outside the valve might be able to determine the position of a ferrite core in a similar fashion to an linear variable differential transformer (LVDT). Alternatively, a piston may be moved by hydraulic force. The cylinder may be of a non-metalic substance and provided with a metallic plate at the end of the cylinder opposite the piston. As the piston moves outward, the capacitance between the metallic plate and the piston should decrease. This small change might be detected by use of a resonant circuit and a microprocessor.

In other embodiments, stem movement may be detected by resistive techniques. The drawback to resistive techniques is the presence of rubbing contacts, which could easily get worn or contaminated.

In the second illustrative embodiment, a thermistor or other suitable electronic sensor may be used to detect the return fluid temperature. This temperature could then be sent to a microprocessor, which would control the position of a control valve using an actuator. If the actuator were one which goes to a position as a function of a control signal, then the microprocessor could send position feedback to the BMS based on the control signal it was outputting.

Figure 4:
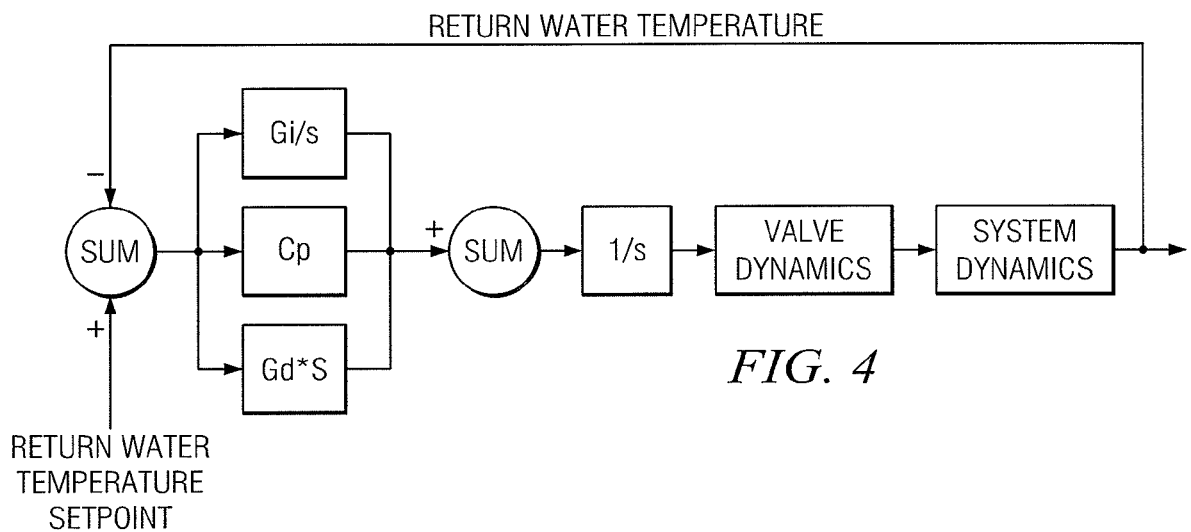
FIG. 4 is a proportional integral derivative (PID) loop in Laplace notation, according to an embodiment of the invention.

In particular embodiments, a micro-controller may implement a proportional integral derivative (PID) control system for moving the stem to maintain a constant return fluid temperature. In such a system, the difference between the current temperature and the target temperature may be called the error signal. The position of the valve may be determined based on a weighted combination of the error signal, its time derivative, and its time integral. In some cases, this combination would be used to determine the rate at which the valve opening is being changed. FIG. 4 show a PID loop in Laplace notation, according to an embodiment of the invention.

In particular embodiments, the electronic sensor may change the setpoint temperature according to the demand. For example, at low demand the return fluid temperature might be set quite high, for example, at 65° F. At a higher demand the return fluid temperature might be set, for example, at 55° F.

Figure 5:
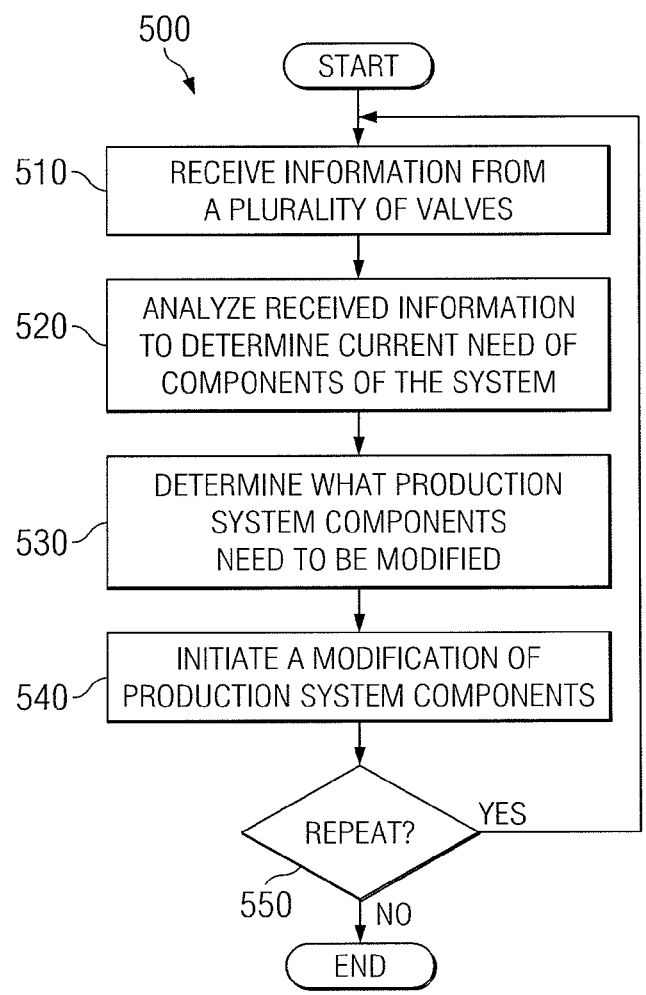
FIG. 5 illustrates a method of modifying parameters of a system in response to changes in loads at terminal.

FIG. 5 illustrates a method 500 of modifying parameters of a system in response to changes in loads at terminal, according to an embodiment of the invention. The method 500 commences at a step 510 of receiving information from a plurality of valves. For example, in particular embodiments, a BMS may receive information including, but not limited to, a valve identifier, a valve-stem position, the degree the valve is opened, a size of the valve, and a temperature of a fluid at the valve. The receipt of this information may arise as a result of a specific poll or "ping' from the BMS to the valves or the valves periodically sending information to the BMS. Additionally, in particular embodiments, the information may be communicated directly the BMS. In other embodiments, the information may be relayed through other components, including other valves.

After receiving the information from the plurality of valves at a step 510, the method may proceed to a step 520 of analyzing the received information to determine the currents need of components of the system.

After analyzing the received information to determine the current need of components of the system at step 520, the method may proceed to a step 530 of determining what production system need to be modified in order to meet the needs of the components of the system. According to particular embodiments, part of the determination may include considering a variety of thresholds built into the system. For example, a return temperature may be maintained at something close to a desired dew-point temperature. Accordingly, the supply temperature may need to remain below that temperature by an amount sufficient to account for inaccuracies in measurement.

To facilitate the analysis and determination of steps 520 and 530, particular embodiments may include a variety of logic encoded in media and components that are similar or different than the components of the general purpose computer 110 of FIG. 1. In particular embodiments, the logic may have a predictive model to consider among other things, environmental factors (e.g., a change in temperature outside of a building) that can affect changes in the system. Additionally, in particular embodiments, the determination logic may consider a variety of items, including, but not an overall efficiency of the system, loads throughout the system, the distances of certain loads from the production equipment, sizing and number of valves associated with a particular load, the number and capacity of pumps, the capacity of chillers (for cooling systems) and/or heaters (for heating systems). The logic may additionally consider additional items, including, but not limited to, other items discussed herein.

After determining what production components of the system need to be modified, the production system may proceed to a step 530 of initiating modification of such system components at step 540. As briefly indicated above, the modification may include, but is not limited to changing pump speeds, changing temperatures of a fluid (e.g., by modifying chiller and/or heaters), changing other system components, or changing a combination of the preceding.

As one example of changes, the logic may initiate only small change to the system if there is only one load in the entire system. However, if there are multiple loads, the logic may initiate larger changes to the system.

After initiating modification at step 540, the method 500 may determine whether the steps 510, 520, 530, and 540 need to be repeated. If so, the method repeats such steps. If not, the method ends. Various iteration of the method 500 may run in parallel with other iterations of the method 500.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for regulating temperature in a system, the method comprising:

receiving, at a building management system, information concerning stem positions of a plurality of control valves, the plurality of control valves each being associated with at least one of a plurality of terminals, each of the plurality of terminals being in communication with a supply header line of a hydronic system, the hydronic system comprising production equipment supplying a fluid to the header line;

determining, based on the information concerning stem positions of the plurality of control valves, whether changes need to be made to the production equipment of the hydronic system, wherein the changes to the production equipment of the hydronic system change at least one parameter of the fluid being supplied to the supply header line of the hydronic system; and making a change to the production equipment in response to determining that changes need to be made, the change to the production equipment yielding a difference in the at least one parameter of the fluid, wherein:

making a change to the production equipment includes at least one of the following:

changing a temperature of a chiller supplying the fluid to the supply header line of the hydronic system;

changing a temperature of a heater supplying the fluid to the supply header line of the hydronic system; or changing a speed of at least one pump supplying fluid to the supply header line of the hydronic system, and at least one of the plurality of control valves is positioned between at least one of the plurality of terminals and a return header line and maintains a substantially constant temperature of fluid provided to the return header line.

2. The method of claim 1, wherein determining whether changes need to be made to the production equipment of the hydronic system includes a consideration that a temperature of the fluid in the hydronic system should not exceed threshold parameters of a humidity control scheme.

3. The method of claim 1, wherein at least some of the information received is communicated using a relay technique.

4. The method of claim 1, wherein at least some of the information received at the building management system is communicated wirelessly.

5. A method for regulating temperature in a system, the method comprising:

receiving, at a building management system, information concerning a degree of opening of a plurality of control valves, the plurality of control valves each being associated with at least one of a plurality of terminals, each of the plurality of terminals being in communication with a supply header line of a hydronic system, the hydronic system comprising production equipment supplying a fluid to the header line;

determining, based on the information concerning the degree of opening of the plurality of control valves, whether changes need to be made to the production equipment of the hydronic system, wherein the changes to the production equipment of the hydronic system change at least one parameter of the fluid being supplied to the supply header line of the hydronic system; and making a change to the production equipment in response to determining that changes need to be made, wherein making a change to the production equipment yields a difference in the at least one parameter of the fluid.

6. The method of claim 5, wherein making a change to the production equipment includes initiating a change to a speed of at least one pump supplying fluid to the supply header line of the hydronic system.

7. The method of claim 5, wherein making a change to the production equipment includes one of the following:
   changing a temperature of a chiller supplying the fluid to the supply header line of the hydronic system; or
   changing a temperature of a heater supplying the fluid to the supply header line of the hydronic system.

8. The method of claim 5, wherein making a change to the production equipment includes:
   changing a temperature of a heater supplying the fluid to the supply header line of the hydronic system, and
   changing a speed of at least one pump supplying fluid to the supply header line of the hydronic system.

9. The method of claim 5, wherein
   at least one of the plurality of control valves is positioned between at least one of the plurality of terminals and a return header line; and
   the at least one of the plurality of control valves is operable to maintain a substantially constant temperature of fluid provided to the return header line.

10. The method of claim 5, wherein the information concerning the degree of opening of the plurality of control valves is a stem position of each of the plurality of control valves.

11. The method of claim 5, wherein at least some of the information received at the building management system is communicated wirelessly.

12. The method of claim 5, wherein at least some of the information received at the building management system is communicated using a relay technique.

13. The method of claim 5, wherein determining whether changes need to be made to production equipment of the hydronic system includes a consideration that a temperature of the fluid in the hydronic system should not exceed threshold parameters of a humidity control scheme.

14. A system for regulating temperature, the system comprising logic encoded in a computer-readable media such that when executed is operable to:
   receive information concerning a degree of opening of a plurality of control valves, the plurality of control valves each being associated with at least one of a plurality of terminals, each of the plurality of terminals being in communication with a supply header line of a hydronic system, the hydronic system comprising production equipment supplying a fluid to the header line;

determine, based on the information concerning the degree of opening of the plurality of control valves, whether changes need to be made to the production equipment of the hydronic system, wherein the changes to the production equipment of the hydronic system change at least one parameter of the fluid being supplied to the supply header line of the hydronic system making a change to the production equipment in response to determining that changes need to be made, wherein making a change to the production equipment yields a difference in the at least one parameter of the fluid.

15. The system of claim 14, wherein making a change to the production equipment includes initiating a change to a speed of at least one pump supplying fluid to the supply header line of the hydronic system.

16. The system of claim 14, wherein making a change to the production equipment includes on of the following:
   initiating a change to a temperature of a chiller supplying the fluid to the supply header line of the hydronic system; or
   initiating a change to a temperature of a heater supplying the fluid to the supply header line of the hydronic system.

17. The system of claim 14, wherein making a change to the production equipment include:
   initiating a change to one of the following:
      a temperature of one of a chiller supplying the fluid to the supply header line of the hydronic system; or
      a temperature of a heater supplying the fluid to the supply header line of the hydronic system; and
   changing a speed of at least one pump supplying fluid to the supply header line of the hydronic system.

18. The system of claim 14, wherein
   at least one of the plurality of control valves is positioned between at least one of the plurality of terminals and a return header line; and
   the at least one of the plurality of control valves is operable to maintain a substantially constant temperature of fluid provided to the return header line.

19. The system of claim 14, wherein the information concerning the degree of opening of the plurality of control valves is a stem position of each of the plurality of control valves.

20. The system of claim 14, wherein at least some of the information received is communicated wirelessly.

21. The system of claim 14, wherein at least some of the information received is communicated using a relay technique.

22. The system of claim 14, wherein determining whether changes need to be made to the production equipment of the hydronic system includes a consideration that a temperature of the fluid in the hydronic system should not exceed threshold parameters of a humidity control scheme.

* * * * *